US011079910B1

United States Patent
Wehrung et al.

(10) Patent No.: US 11,079,910 B1
(45) Date of Patent: Aug. 3, 2021

(54) SOFTPHONE CONTROL INTEGRATION

(71) Applicant: Fuze, Inc., Boston, MA (US)

(72) Inventors: Clement Wehrung, Paris (FR); Jedidiah Brown, Seattle, WA (US)

(73) Assignee: Fuze, Inc., Boston, MA (US)

( * ) Notice: Subject to any disclaimer, the term of this patent is extended or adjusted under 35 U.S.C. 154(b) by 17 days.

(21) Appl. No.: 16/269,197

(22) Filed: Feb. 6, 2019

(51) Int. Cl.
*G06F 3/0484* (2013.01)
*G06F 3/0483* (2013.01)
*G06F 3/0482* (2013.01)
*H04L 29/06* (2006.01)

(52) U.S. Cl.
CPC .......... *G06F 3/0484* (2013.01); *G06F 3/0482* (2013.01); *G06F 3/0483* (2013.01); *H04L 67/42* (2013.01)

(58) Field of Classification Search
CPC ........................................................ G06F 3/14
USPC ....... 715/739; 379/142.06; 706/47; 370/352, 370/401
See application file for complete search history.

(56) References Cited

U.S. PATENT DOCUMENTS

| 8,660,247 | B1 * | 2/2014 | Brown | H04M 15/8083 379/142.06 |
| 9,762,737 | B1 * | 9/2017 | Liu | H04M 7/009 |
| 2001/0005372 | A1 * | 6/2001 | Cave | H04L 29/06 370/401 |
| 2003/0091028 | A1 * | 5/2003 | Chang | H04M 7/0057 370/352 |
| 2005/0068936 | A1 * | 3/2005 | Keskiniva | H04L 12/6418 370/352 |
| 2008/0114713 | A1 * | 5/2008 | Gray | H04M 3/42365 706/47 |
| 2018/0234550 | A1 * | 8/2018 | Lifson | H04L 69/08 |
| 2019/0253556 | A1 * | 8/2019 | Nadalin | H04M 3/58 |

* cited by examiner

*Primary Examiner* — Ruay Ho
(74) *Attorney, Agent, or Firm* — McDermott Will & Emery LLP

(57) ABSTRACT

A computing device may send a request to a telephony server over a network to initiate a call with a telephony device, and may output for display a graphical user interface (GUI). A first process executing at the computing device may provide a first one or more call controls in the GUI for controlling the call. A second process executing at the computing device may provide a second one or more call controls in the GUI for controlling the call. In response to receiving user input indicative of a selection of a call control from the first one or more call controls to perform an action for the call, the second process may update the second one or more call controls based at least in part on the action to be performed.

18 Claims, 6 Drawing Sheets

SOFTPHONE CONTROL INTEGRATION

TECHNICAL FIELD

The present disclosure generally relates to Internet telephony and more specifically relates to integrating softphone call controls in different computer processes and applications.

BACKGROUND

A softphone is software for making voice over Internet Protocol (VoIP) calls over the Internet using a general purpose computer without using a physical telephone (e.g., a mobile phone or a landline phone). The softphone software may communicate with a telephony server that may be able to connect a call between the general purpose computer and another telephony device, such as a telephone or another general purpose computer that is also running softphone software. The softphone software may provide call controls with which users may interact for controlling the call. For example, the call controls may enable the user to hang up the call, mute the call, conference an additional participant into the call, and the like.

The description provided in the background section should not be assumed to be prior art merely because it is mentioned in or associated with the background section. The background section may include information that describes one or more aspects of the subject technology.

SUMMARY

In general, aspects of the disclosure are directed to integrating call controls for a softphone application into different computer processes and applications of a computing device, so that different computer processes and applications of the computing device may present call controls during a call. A first process executing at a computing device and a second process executing at the computing device may provide respective first and second call controls for controlling a call between a computing device and a second computing device. When a user interacts with the first call controls to select an action to be performed for the call, the second process may update the second call controls based on the action to be performed for the call to synchronize the first and second call controls.

According to certain aspects of the present disclosure, a method for controlling a call across multiple processes is provided. The method includes sending, by a computing device, a request to a telephony server over a network to initiate a call between the computing device and a telephony device. The method further includes outputting, by the computing device for display at a display device, a graphical user interface (GUI). The method further includes providing, by a first process executing at the computing device, a first one or more call controls in the GUI for controlling the call. The method further includes providing, by a second process executing at the computing device, a second one or more call controls in the GUI for controlling the call. The method further includes in response to receiving user input indicative of a selection of a call control from the first one or more call controls to perform an action for the call, updating, by the second process executing at the computing device, the second one or more call controls based at least in part on the action to be performed for the call.

According to certain aspects of the present disclosure, a system for integrating call controls for controlling a call across multiple processes is provided. The system includes a memory configured to store a first process and a second process. The system further includes a processor. The process is configured to send a request to a telephony server over a network to initiate a call between the system and a telephony device. The process is further configured to output, for display at a display device, a graphical user interface (GUI). The process is further configured to execute the first process to provide a first one or more call controls in the GUI for controlling the call. The process is further configured to execute the second process to provide a second one or more call controls in the GUI for controlling the call. The process is further configured to, in response to receiving user input indicative of a selection of a call control from the first one or more call controls to perform an action for the call, execute the second process to update the second one or more call controls based at least in part on the action to be performed for the call.

According to certain aspects of the present disclosure, an apparatus is provided. The apparatus includes means for sending a request to a telephony server over a network to initiate a call between a computing device and a telephony device. The apparatus further includes means for displaying, at a display device, a graphical user interface (GUI). The apparatus further includes means for executing the first process to provide a first one or more call controls in the GUI for controlling the call. The apparatus further includes means for executing the second process to provide a second one or more call controls in the GUI for controlling the call. The apparatus further includes means for, in response to receiving user input indicative of a selection of a call control from the first one or more call controls to perform an action for the call, execute the second process to update the second one or more call controls based at least in part on the action to be performed for the call.

According to certain aspects of the present disclosure, a non-transitory machine-readable storage medium comprising machine-readable instructions for causing a processor of a computing device to execute a method for integrating call controls for controlling a call across multiple processes is provided. The method includes sending a request to a telephony server over a network to initiate a call between the computing device and a telephony device. The method further includes outputting, for display at a display device, a graphical user interface (GUI). The method further includes providing, by a first process, a first one or more call controls in the GUI for controlling the call. The method further includes providing, by a second process, a second one or more call controls in the GUI for controlling the call. The method further includes in response to receiving user input indicative of a selection of a call control from the first one or more call controls to perform an action for the call, updating, by the second process, the second one or more call controls based at least in part on the action to be performed for the call.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1A:
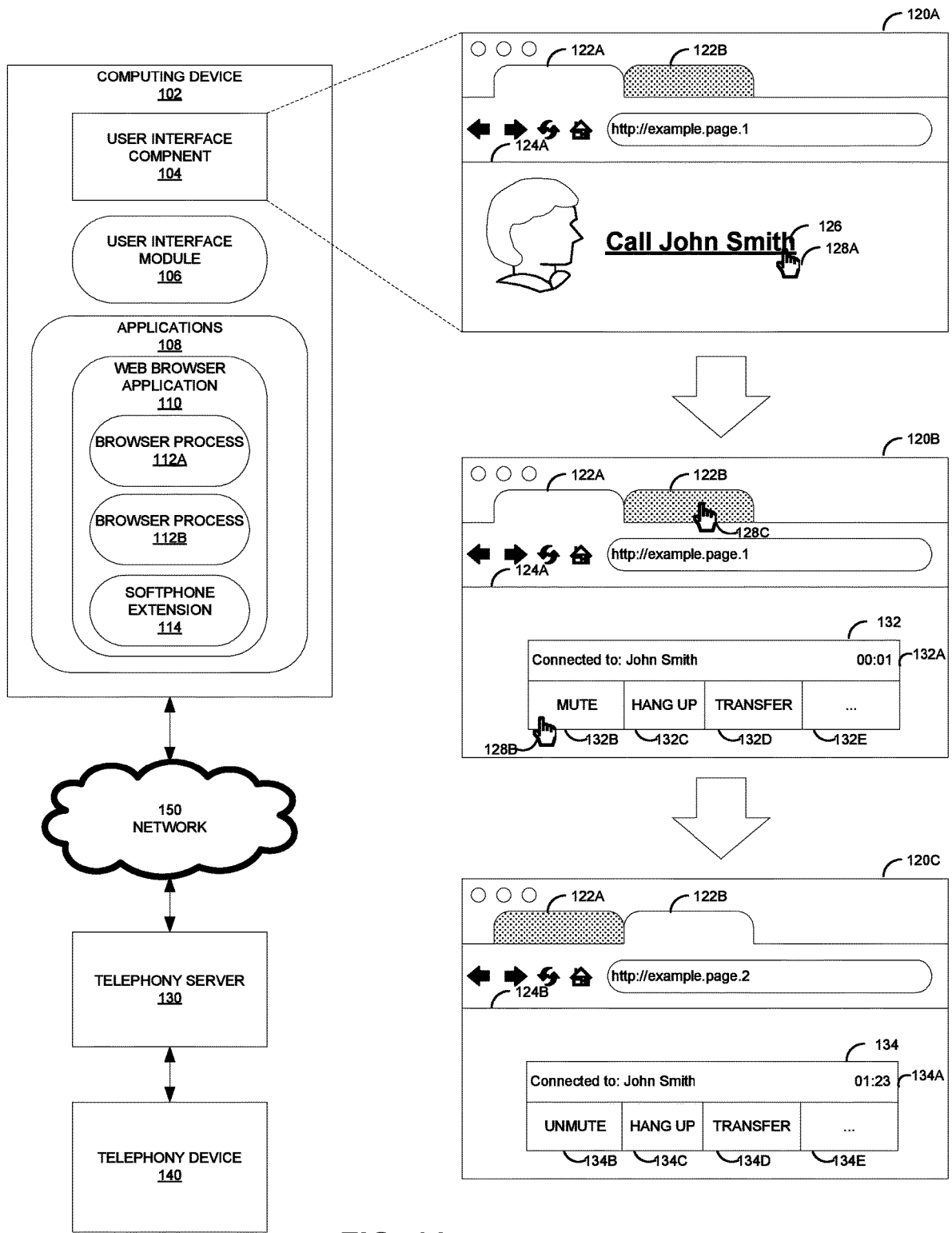
FIGS. 1A and 1B illustrate an example architecture for integrating call controls for controlling a call across multiple processes.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for integrating call controls for controlling a call across multiple processes executing at a computing device, so that different computer processes and applications of the computing device may present call controls during a call. A first process executing at a computing device and a second process executing at the computing device may provide respective first and second call controls for controlling a call between a computing device and a second computing device. When a user interacts with the first call controls to select an action to be performed for the call, the second process may update the second call controls based on the action to be performed for the call to synchronize the first and second call controls.

A computing device may include a softphone application that enables the computing device to initiate and establish a call between the computing device and a telephony device over a network, such as the Internet When the call is established, the softphone application may provide controls for controlling the call in its user interface (e.g., application window), such as muting the call, ending the call, and the like. However, if the user of the computing device interacts with the computing device to switch to another application, the controls provided by the softphone application may be hidden in the graphical user interface outputted by the computing device. As such, in order to control the call, the user may be required to interact with the computing device to switch back to the application providing the controls for the call in order to control the call. This may require the user to provide additional user input in order to access the controls for the call.

The disclosed system reduces the amount of user input required to access the controls for controlling a call by having multiple applications and processes that may each provide controls for controlling the call. The user may switch between different applications and processes that each provides controls for controlling the call without having to switch back to a single application or process that provides controls in order to control the call. Instead, the user may use the controls provided by any of the different applications and processes to control the call, thereby reducing the amount of user input required to control a call.

The disclosed system addresses a technical problem tied to computer technology and overcomes a technical problem specifically arising in graphical user interfaces, namely the technical problem of the amount of user interaction required to access the controls provided by an application or process for controlling a call when the user switches away from the application or process that provides the controls. By having multiple applications and processes each provide controls in the graphical user interface for controlling the same call, the user may be able to switch amongst and interact with any of those applications and processes that provide controls for controlling the call without having to provide additional user input and user interactions to switch back to a single application or process in order to access the controls for controlling the call. This thereby reduces the amount of user interactions required in order to access the controls for controlling the call at the computing device.

Example System Architecture

Figure 1B:
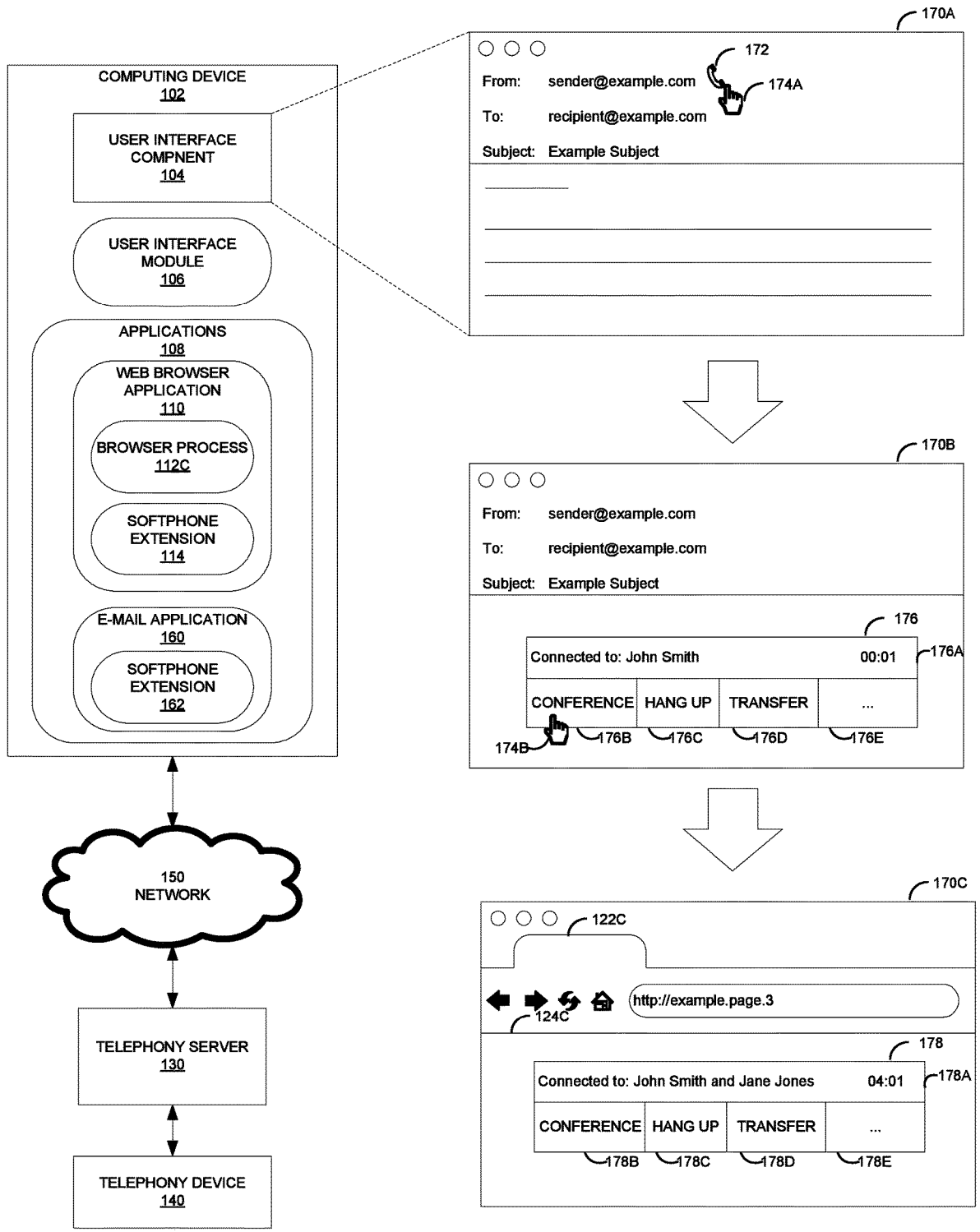

FIGS. 1A and 1B illustrate an example architecture 100 for integrating call controls for controlling a call across multiple processes. The architecture 100 includes computing device 102 connected over a network 150 with telephony server 130 to communicate with telephony device 140. In particular, computing device 102 may communicate with telephony server 130 via network 150 to initiate and establish a call between computing device 102 and telephony device 140. A call may include any suitable audio and/or video communications session, such as a phone call, a Voice over Internet Protocol (VoIP) call, a videoconference, an audioconference, voice chat, video chat, and the like.

Computing device 102 represents individual mobile or non-mobile computing devices that are configured to communicate with telephony server 130 via network 150 to establish an audio and/or visual communications session with telephony device 140. Examples of computing device 102 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to send and receive data to and from telephony server 130 via a network, such as network 150.

Telephony server 130 can be any device having an appropriate processor, memory, and communications capability for hosting a telephony service that executes to establish audio and/or visual calls between devices. Telephony server 130 may represent any suitable remote computing system, such as one or more desktop computers, laptop computers, mainframes, servers, cloud computing systems, etc. capable of sending and receiving information both to and from a network, such as network 150. In some examples, telephony server 130 may represent cloud computing systems that provide access to their respective services via a cloud. In certain aspects, telephony server 130 can be a cloud computing server of an infrastructure-as-a-service (IaaS) and be able to support a platform-as-a-service (PaaS) and software-as-a-service (SaaS) services.

Network 150 may include one or more network hubs, network switches, network routers, or any other network equipment, that are operatively inter-coupled thereby providing for the exchange of information between computing device 102 and telephony server 130. Computing device 102 and telephony server 130 may transmit and receive data across network 150 using any suitable communication techniques. Computing device 102 and telephony server 130 may each be operatively coupled to network 150 using respective network links. The links coupling computing device 102 and telephony server 130 to network 150 may be Ethernet or other types of network connections and such connections may be wireless and/or wired connections.

Telephony device 140 may be any suitable device that may perform audio and/or video communications. Examples of telephony device 140 may include mobile phones, desktop phones, VoIP phones, desktop computers, laptop computers, and the like. Telephony server 130 may connect to telephony device 140 via a network (e.g., the Internet), a private branch exchange (PBX), plain old telephone service (POTS), and the like.

In the example of FIGS. 1A and 1B, computing device 102 includes user interface component 104, user interface module 106, and applications 108. User interface component 104, user interface module 106, and applications 108 may perform operations described using software, hardware, firmware, or a mixture of hardware, software, and firmware residing in and/or executing at computing device 102. Computing device 102 may execute user interface component 104, user interface module 106, and applications 108 with multiple processors or multiple devices. In some examples, computing device 102 may execute user interface component 104, user interface module 106, and applications 108 as virtual machines executing on underlying hardware. In some examples, user interface component 104, user interface module 106, and applications 108 may also execute as one or more services of an operating system or computing platform, or as one or more executable programs at an application layer of a computing platform.

User interface component 104 of computing devices 102 may function as an input and/or output device for computing device 102. User interface component 104 may be implemented using various technologies. For instance, user interface component 104 may function as an input device using a mouse, keyboard, presence-sensitive input screens, microphone technologies, infrared sensor technologies, or other input device technology for use in receiving user input.

User interface component 104 may function as output (e.g., display) device and present output to a user. User interface component 104 may function as an output device using any one or more display devices capable of outputting visible information to a user of computing devices 102. User interface component 104 may also function as output device using speaker technologies, haptic feedback technologies, or other output device technology for use in outputting information to a user. User interface component 104 may function as an output device to present a user interface (e.g., user interfaces 120A and 120B). User interface component 104 may present a user interface related to other features of computing platforms, operating systems, applications, and/or services executing at and/or accessible from computing device 102 (e.g., e-mail, chat, online services, telephone, gaming, etc.).

User interface modules 106 may manage user interactions with user interface component 104 and other components of computing devices 102. User interface module 106 and user interface component 104 may receive one or more indications of input (e.g., keyboard input, mouse input, voice input, touch input, gesture input, etc.) from a user as the user interacts with the user interface, at different times and when the user and computing devices 102 are at the same or different locations. User interface module 106 and user interface component 104 may interpret inputs detected at user interface component 104 and may relay information about the inputs detected at user interface component 104 to applications 108 and/or one or more other associated platforms, operating systems, applications, and/or services executing at computing devices 102, for example, to cause computing devices 102 to perform functions.

User interface modules 106 may cause user interface component 104 to output, display, or otherwise present a user interface while a user of computing device 102 views output and/or provides input at user interface component 104. For example, as shown in FIG. 1, user interface module 106 may send instructions to user interface component 104 that cause user interface component 104 to display user interfaces 120A-120C at a display device of user interface component 104. User interface module 106 may also cause user interface component 104 to output a user interface in non-visual form, such as audio output.

User interface module 106 and user interface component 104 may receive one or more indications of input (e.g., voice input, touch input, non-touch or presence-sensitive input, video input, audio input, etc.) from a user as the user interacts with user interfaces 120A-120C, at different times and when the user and computing device 102 are at different locations. User interface module 106 and user interface component 104 may interpret inputs detected at user interface component 104 and may relay information about the inputs detected at user interface component 104 to applications 108 and/or one or more other associated platforms, operating systems, applications, and/or services executing at computing device 102, for example, to cause computing device 102 to perform functions.

As shown in FIG. 1A, user interface module 106 may cause user interface component 104 to output user interface 120A that enables a user to interact with computing device 102. In particular, a user may interact with an application (e.g., one of applications 108) currently executing at computing device 102 using user interface 120A to activate functionality of the application, such as to initiate, establish, end, or otherwise control a call between computing device 102 and telephony device 140.

User interface 120A is a graphical representation of web browser application 110 executing at computing device 102, having browser tabs 122A and 122B. In user interface 120A, browser tab 122A is the foreground tab of web browser application 110, and contents 124A of browser tab 122A are shown in user interface 120A.

Web browser application 110 may include a separate operating system process for each browser tab and/or browser window of web browser application 110, so that each separate operating system process may execute to render the contents of a corresponding browser tab and/or browser window. In the example of FIG. 1A, web browser application 110 may include browser processes 112A and 112B associated with respective browser tabs 122A and 122B that execute to render the contents 124A and 124B of web pages in browser tabs 122A and 122B.

Web browser application 110 may include softphone extension 114 that provides softphone functionality for web browser application 110, so that a user may use web browser application 110 to initiate and control a call between computing device 102 and telephony device 140. Softphone extension 114 may communicate with telephony server 130 in order to establish a call with a telephony device (e.g., telephony device 140), and may be able to access audio and/or video input devices (e.g., webcams and microphones) of computing device 102 as well as audio and/or video output devices (e.g., speakers) of computing device 102 in order to send and receive audio and/or video data as part of the call.

Softphone extension 114 may also enable users to interact with the contents rendered by web browser application 110 in order to initiate a call with a telephony device. For example, softphone extension 114 may enable a user to select a link in a web page to initiate a telephone call to a telephony device associated with the selected link. In the example of FIG. 1A, browser process 112A may execute to render contents 124A of browser tab 122A that includes link 126, and a user may perform input 128A, to select link 126 to initiate a call to telephony device 140 associated with link 126.

For instance, a user of computing device 102 may perform input 128A at user interface component 104. User interface component 104 may detect input 128A and send an indication of the input to user interface module 106. User interface module 106 may provide data to softphone extension 114 based on the received indication, and the web browser application may determine that input 128A corresponds to a selection of link 126.

A computing device may send a request to a telephony server over a network to initiate a call between the computing device and a telephony device 140. In the example of FIG. 1, in response to receiving the data based on the received indication, softphone extension 114 of web browser application 110 may send data to telephony server 130 via network 150. The data may indicate a request to initiate a call with a telephony device associated with link 126. Telephony server 130 may determine that link 126 is associated with telephony device 140 and may establish a call between computing device 102 and the telephony device 140.

In response to establishing the call between computing device 102 and the telephony device 140, telephony server 130 may send, via network 150 to computing device 102, an indication that it has established the call between computing device 102 and telephony device 140. Softphone extension 114 may receive the indication from telephony server 130 and may, in response, cause browser process 112A to update contents 124A of browser tab 122A to render controls for controlling the call in contents 124A and to cause browser process 112B to update contents 124B of browser tab 122B to render controls for controlling the call in contents 124B.

The first device may output, for display at a display device, a graphical user interface (GUI) that includes call controls for controlling the telephone call. In the example of FIG. 1A, in response to receiving the indication from telephony server 130 that it has established a call between computing device 102 and telephony device 140, web browser application 110 may send data to user interface module 106 to cause user interface component 104 to output user interface 120B.

A first process executing at the computing device may provide a first one or more call controls in a first portion of the GUI associated with the first process for controlling the call established between the computing device and the telephony device. Call controls include control elements (e.g., widgets) in a GUI such as buttons, sliders, and the like that the user may select or with which a user may otherwise interact to cause computing device to perform one or more actions with respect to the call. Call controls may be selectable to cause computing device 102 and/or telephony server 130 to perform one or more of: receiving the call, recording the call, pausing recording of the call, muting the call, unmuting the call, placing the call on hold, resuming the call from hold, transferring the call, sending the call to voicemail, conferencing one or more additional participants into the call, and the like. The call controls may also include status information associated with the call, such as caller identification, the participants in the call, the current duration of the call, and the like.

In the example of FIG. 1A, softphone extension 114 may cause browser process 112A to execute at computing device 102 to render contents 124A of browser tab 122A in user interface 120B to include call controls 132 for controlling the call between computing device 102 and telephony device 140. As shown, call controls 132 may include call status information 132A, mute control 132B, hang up control 132C, call transfer control 132D, and more options control 132E. It should be understood that call controls 132 is just one example of a set of call controls, and that call controls may include any other suitable controls as described above that, when selected, may cause computing device 102 to perform the functionalities described above.

Call status information 132A may provide information regarding the status of the call, such as the identity of one or more participants of the call, the duration of the call, and the like. Mute control 132B may be selected to mute the call. Hang up control 132C may be selected to hang up the call. Call transfer control 132D may be selected to hang up the call, and more options control 132E may be selected to provide additional call control options. A user may select any of controls 132B-132E to cause computing device 102 and/or telephony server 130 to perform an action on the call.

For example, the user may provide input 128B to select mute control 132B to mute the call. User interface component 104 may detect input 128B corresponding to the selection of mute control 132B in user interface 120B. Browser process 112A may determine that input 128B corresponds to a selection of mute control 132B. In response to determining that input 128B corresponds to a selection of mute control 132B, browser process 112A may cause softphone extension 114 to mute the audio input device (e.g., microphone) of computing device 102.

In response to receiving user input indicative of a selection of a call control from the first one or more call controls to perform an action associated with the call control, the first device may send, to the telephony server, an indication of the action to be performed for the telephonic call. The telephony server may utilize the indication of the action to be performed to keep track of the state of the call, to synchronize other call controls at the first device based on the action to be performed, and/or may perform the indicated action.

In the example of FIG. 1A, in response to determining that input 128B corresponds to a selection of mute control 132B, browser process 112A may also cause softphone extension 114 to send an indication of the action to be performed for the telephonic call that is associated with the selection of mute control 132B to telephony server 130, so that telephony server 130 may track the state of the call as being muted, and may also send an indication that computing device 102 has muted the call to telephony device 140.

In accordance with aspects of the present disclosure, multiple processes and applications executing at the computing device may each provide call controls for controlling a call between the computing device and a telephony device, so that users of the computing device may control a telephonic call between a computing device and a telephony device from different processes and applications. When a user switches from the process in which the call was initiated and which provides call controls for controlling the call to another different process on the computing device, the other process may also provide call controls for controlling the call. This may be useful when the user of the computing device switches away from the browser tab or application from which the call was initiated to a different browser tab or application, and enables the user to control the call even when the browser tab or application from which the call was initiated is not visible in the user interface.

As shown in FIG. 1A, user interface component 104 may detect input 128C corresponding to a selection of browser tab 122B in user interface 120B. Web browser application 110 may determine that input 128C corresponds to a selection of browser tab 122B. In response, web browser application 110 may send data to user interface module 106 to cause user interface component 104 to output user interface 120C. User interface 120C is a graphical representation of the web browser application executing at computing device 102 having browser tabs 122A and 122B, where browser tab 122B is active in response to user input 128B corresponding to the selection of browser tab 122B, such that the contents of browser tab 122B are shown in user interface 120C.

A second process executing at the first device may provide a second one or more call controls in a second portion of the GUI associated with the second process for controlling the telephone call. Call controls include control elements (e.g., widgets) in a GUI such as buttons, sliders, and the like that the user may select or with which a user may otherwise interact to cause computing device to perform one or more actions with respect to the call. Call controls may be selectable to cause computing device 102 and/or telephony server 130 to perform one or more of: receiving a call, recording an active call, pause active call recording, muting or unmuting a call, placing a call on hold, receiving a call from hold, blind transfer of a call, attended transfer of a call, sending a call to voicemail or receiving voicemail data, initiating or receiving a conference call, and the like. The call controls may also include status information associated with the call, such as the participants in the call, the current duration of the call, and the like.

In the example of FIG. 1A, softphone extension 114 may cause browser process 112B to execute at computing device 102 to render contents 124B of browser tab 122B in user interface 120C to include call controls 134 for controlling the call between computing device 102 and telephony device 140. Call controls 134 provided by browser process 112B is similar to call controls 132 provided by browser process 112A in that call controls 132 and 134 are usable to control the same call (i.e., a single call) established by telephony server 130 between computing device 102 and telephony device 140. Thus, no matter whether contents 124A of browser tab 122A is visible or whether contents 124B of browser tab 122B is visible in the user interface outputted by user interface component 104, the user may be able to interact with one of call controls 132 or 134 to control the call between computing device 102 and telephony device 140.

Computing device 102 and telephony server 130 may synchronize the state of each of the call controls (e.g., call controls 132 and 134) being presented by processes executing at computing device 102 (e.g., browser process 112A and browser process 112B) during the call. Thus, when the state of the call changes, the processes presenting call controls for the call may receive updated call state information that processes may use to update the call controls being presented based on the updated call state information. In some examples, processes may communicate with each other to send and receive updated call state information to update the respective call controls. For example, browser process 112A and browser process 112B may communicate by passing messages via softphone extension 114.

The second process executing at the second device may update the second one or more call controls based at least in part on the first action to be performed for the telephonic call. The first process may send updated call state information to the second process to indicate that the action has been performed, and the second process may update the second one or more call controls based at least in part on the updated call state information. Referring back to user interface 120B, when the user selects mute control 132B, browser process 112A may communicate with browser process 112B via softphone extension 114 to send updated call state information indicating that the call has been muted.

In response, browser process 112B may update the call controls 134 rendered by browser process 112 in contents 124B of browser tab 122B. As shown in FIG. 1B, call controls 134 includes call status information 134A, unmute control 134B, hang up control 134C, call transfer control 134D, and more options control 134E. Call control 134 includes unmute control 134B rather than mute control 132B in call controls 132 because browser process 112B has received updated call state information indicating that the call has been muted and, in response, has updated call controls 134 to include unmute control 134B.

Similar to call controls 132, the user may provide input via user interface component 104 to interact with the call controls 134. The user may select any of controls 134B-134E to cause computing device 102 and/or telephony server 130 to perform an action on the call.

As the user of computing device 102 interacts with the one or more call controls of call controls 132 and/or call controls 134 to control the call between computing device 102 and the telephony device, browser processes 112A and 112B may continue to communicate with each other and/or with telephony server 130 to send updated call state information to each other. In this way, computing device 102 may synchronize call controls 132 and 134 based on the state of the call between computing device 102 and telephony device 140.

FIG. 1A illustrates just one example of how multiple processes executing at computing device 102 may each provide a set of call controls of a telephonic call. It should be understood that any suitable process executing at computing device 102, including processes other than browser processes of web browser 110, may provide call controls of a telephonic call between computing device 102 and a telephonic device. Processes that may execute at computing device 102 to provide call controls for controlling a call between computing device 102 and another telephony device may include web browser processes, applications, and the like.

Different applications may execute at computing device 102 to provide deported views of call controls of a telephonic call. As shown in FIG. 1B, applications 108 executing at computing device 102 may include web browser application 110 and e-mail application 160. Web browser application 110 and e-mail application 160 may each execute to provide call controls for controlling a call between computing device 102 and a telephony device.

User interface module 106 may cause user interface component 104 to output user interface 170A, which is a message interface for e-mail application 160 that displays a message received by e-mail application 160. E-mail application 160 may include softphone extension 162 that provides softphone functionality for e-mail application 160, so that a user may use e-mail application 160 to initiate and control a call between computing device 102 and a telephony device. For example, softphone extension 162 may modify the message interface to insert call widget 172 in the message interface that enables users to select call widget 172 to initiate a call to the sender of the message displayed in the message interface. Softphone extension 162 may be able to access audio and/or video input devices (e.g., webcams and microphones) of computing device 102 as well as audio and/or video output devices (e.g., speakers) of computing device 102 in order to send and receive audio and/or video data as part of the call.

A user may perform input 174, such as by moving a mouse cursor over call widget 172 and clicking a mouse button, or by performing touch input at a location of a presence-sensitive display associated with call widget 172, to select call widget 172 to initiate a call to the sender of the message. User interface component 104 may detect input 174 and send an indication of the input to user interface module 106. User interface module 106 may provide data to e-mail application 160 based on the received indication, and e-mail application 160 may determine that input 174 corresponds to a selection of call widget 172.

In response to receiving the data based on the received indication, softphone extension 162 of e-mail application 160 may send data to telephony server 130 via network 150. The data may indicate a request to initiate a telephone call with a telephony device associated with the sender of the message. Telephony server 130 may determine that the sender of the message is associated with telephony device 140 and may establish a call between computing device 102 and telephony device 140.

In response to establishing the call, telephony server 130 may send, via network 150 to computing device 102, an indication that it has established a call between computing device 102 and telephony device 140. In response, softphone extension 162 of e-mail application 160 may cause e-mail application 160 to update its message interface to provide call controls for controlling the telephone call.

In the example of FIG. 1B, e-mail application 160 may send data to user interface module 106 to cause user interface component 104 to output user interface 170B, which may be the message interface of e-mail application that has been updated to provide call controls for controlling the call between computing device 102 and telephony device 140. Softphone extension 162 may send data to e-mail application 160 to render call controls 176 for controlling the telephonic call established by telephony server 130 between computing device 102 and telephony device 140.

As shown, call controls 176 may include call status information 176A, conference control 176B, hang up control 176C, call transfer control 176D, and more options control 176E. It should be understood that call controls 176 is just one example of a set of call controls, and that call controls may include any other suitable controls as described above that, when selected, may cause computing device 102 to perform the functionalities described above.

Call status information 176A may provide information regarding the status of the call, such as the identity of one or more participants of the call, the duration of the call, and the like. Conference control 176B may be selected to conference additional participants into the call. Hang up control 176C may be selected to hang up the call. Call transfer control 176D may be selected to hang up the call, and more options control 176E may be selected to provide additional call control options. A user may select any of controls 176B-176E to cause computing device 102 and/or telephony server 130 to perform an action on the call.

For example, the user may provide input 174B to select conference control 176B to conference additional participants into the call. User interface component 104 may detect input 174B corresponding to the selection of conference control 176B in user interface 170B. E-mail application 160 may determine that input 174B corresponds to a selection of conference control 176B. In response to determining that input 174B corresponds to a selection of conference control 176B, e-mail application 160 may cause softphone extension 162 to communicate with telephony server 130 conference in an additional participant.

In response to receiving user input indicative of a selection of a call control from the first one or more call controls to perform an action associated with the first call control, sending, by the first device to the telephony server, an indication of the action to be performed for the telephonic call. In the example of FIG. 1B, softphone extension 162 may send to telephony server 130 an indication of a participant to conference into the call between computing device 102 and telephony device 140. Telephony server 130 may, based on the data received from computing device 102, conference the indicated participant into the call.

In some examples, when a call is initiated by a process other than a softphone web application running in a browser process of web browser application 110, computing device 102 may cause a browser process of web browser application 110 to start the softphone web application and to cause the softphone web application to provide call controls for controlling the call, or may cause a softphone web application running in a browser process of web browser application 110 to provide call controls for controlling the call.

In response to receiving an indication that telephony server 130 has established a call between computing device 102 and telephony device 140, e-mail application 160 may communicate with web browser application 110 to send a request to web browser application 110 to start a softphone web application that provides call controls for controlling the call. For example, E-mail application 160 may send an indication of a network address, such as a Universal Resource Locator (URL), of the softphone web application. Web browser application 110 may receive the request to start the softphone web application, and browser process 112C may execute to access the network address sent by e-mail application 160 to access the indicated softphone web application.

In the example of FIG. 1B, user interface module 106 may cause user interface component 104 to output user interface 170C. User interface 170C is a graphical representation of web browser application 110 having browser process 112C that renders contents 124C of browser tab 122C. Browser process 112C may execute to access the softphone web application indicated by e-mail application 160 and may render the user interface of the softphone web application in contents 124C of browser tab 122C.

Contents 124C of browser tab 122C includes call controls 178, which includes one or more call controls for controlling the call between computing device 102 and telephony device 140. While e-mail application 160 may be able to send a request to web browser application 110 to start a softphone web application that provides call controls for controlling the call, e-mail application 160 may not be able to send updated call state information for the call directly to web browser application 110. Instead, telephony server 130 may communicate with softphone extension 114 to send updated call state information associated with the call to web browser application 110, and softphone extension 114 may update call controls 178 based at least in part on the updated call state information received from telephony server 130.

As discussed above, the user of computing device 102 may interact with call controls 176 provided by e-mail application 160 to conference in an additional participant into the call. Telephony server 130 may, based on the data received from computing device 102, conference the additional participant into the call and, in response, may send updated call state information to web browser application 110 indicating that the additional participant has been conferenced into the call.

Softphone extension 114 of web browser application 110 may receive the updated call state information from telephony server 130 and may, in response, cause browser process 112B to update the call controls 178 based at least in part on the updated call state information. As shown in FIG. 1B, call controls 178 includes call status information 178A, conference control 178B, hang up control 178C, call transfer control 178D, and more options control 178E. Browser process 112B may update the call controls 178 based at least in part on the updated call state information to update call status information 178A to update the participants of the call as listed in call status information 178A, so that it lists the additional participant "Jane Jones" that has been conferenced into the call in addition to the original participant "John Smith" listed in call status information 176A of call controls 176 and call status information 178A of call controls 178.

As the user of computing device 102 interacts with the one or more call controls of call controls 176 and/or call controls 178 to control the call between computing device 102 and telephony device 140, e-mail application 160 and web browser application 110 may communicate with each other and/or via telephony server 130 to send and receive updated call state information. In this way, computing device 102 may synchronize call controls 176 and 178 based on the state of the call between computing device 102 and telephony device 140.

Example Call Control Integration System

Figure 2:
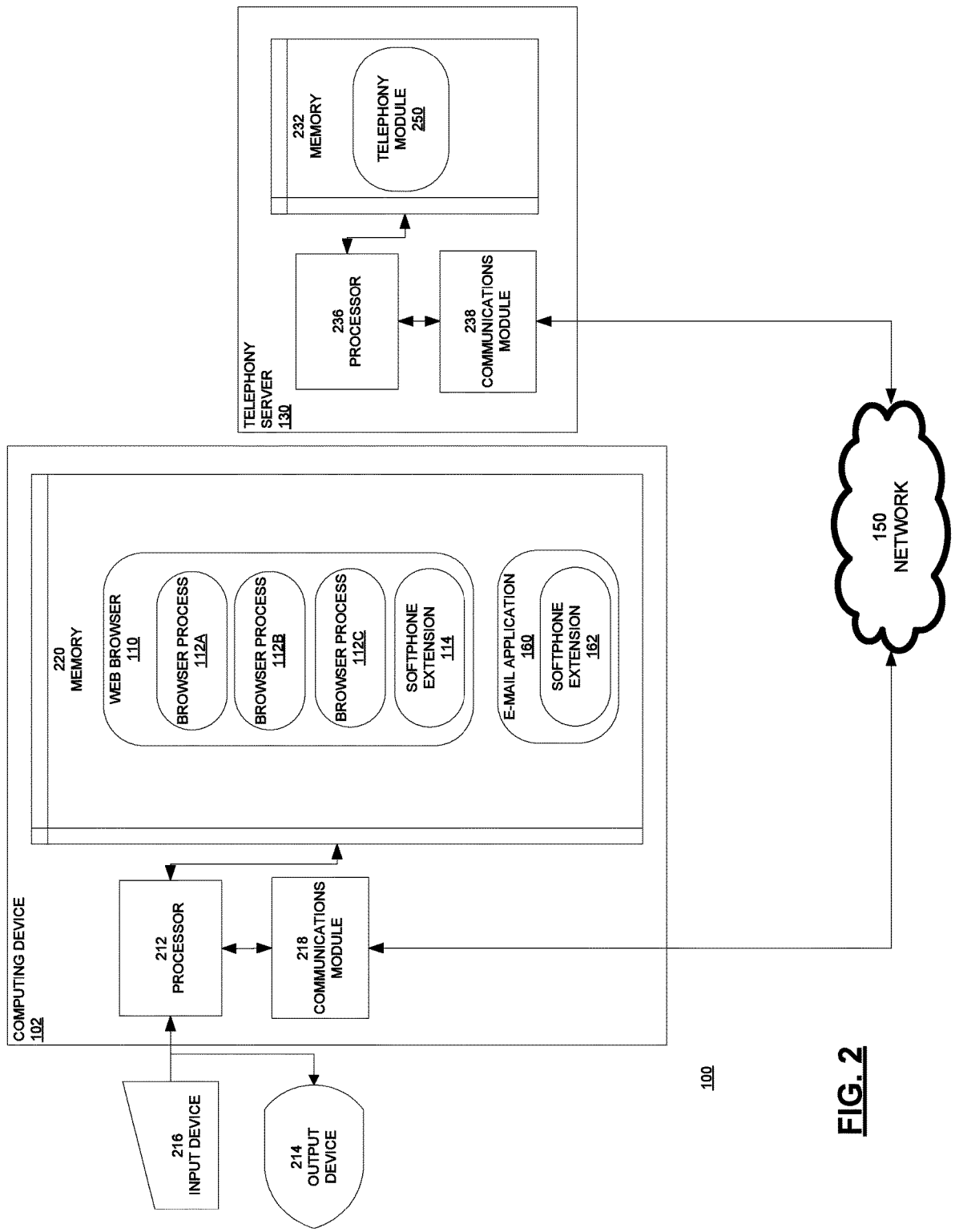
FIG. 2 is a block diagram illustrating an example computing device and telephony server in the architecture of FIGS. 1A and 1B according to certain aspects of the disclosure.

FIG. 2 is a block diagram illustrating an example computing device 102 and telephony server 130 in the architecture 100 of FIGS. 1A and 1B according to certain aspects of the disclosure. As shown in FIG. 2, computing device 102 and telephony server 130 are connected over the network 150 via respective communications modules 218 and 238. The communications modules 218 and 238 are configured to interface with the network 150 to send and receive information, such as data, requests, responses, and commands to other devices on the network. The communications modules 218, 258, and 238 can be, for example, modems or Ethernet cards.

Telephony server 130 includes a processor 236, a communications module 238, and a memory 232 that includes telephony module 250. The processor 236 of telephony server 130 is configured to execute instructions, such as instructions physically coded into the processor 236, instructions received from software (e.g., telephony module 250) in memory 232, or a combination of both. For example, the processor 236 of telephony server 130 executes instructions from telephony module 250 in memory 232 causing processor 236 to establish calls between computing device 102 and one or more telephony devices (e.g., telephony device 140 in FIGS. 1A and 1B) or to otherwise perform the functions of software that is able to establish and control communications sessions, such as VoIP sessions, video conferencing sessions, audio conferencing sessions, and the like, between computing devices and/or telephony devices over network 150. Processor 236 of telephony server 130 may execute instructions from telephony module 250 in memory 232 to receive a request to initiate a call between computing device 102 and a called party. Processor 236 of telephony server 130 may execute instructions from telephony module 250 in memory 232 to determine a telephony device associated with the called party, and may establish a call between computing device 102 and the telephony device associated with the called party.

During the call, processor 236 of telephony server 130 may execute instructions from telephony module 250 in memory 232 to receive, from computing device 102, indications of actions to be performed for the call. Processor 236 of telephony server 130 may execute instructions from telephony module 250 in memory 232 to perform the indicated actions for the call and/or send updated call state information associated with the actions to be performed to computing device 102.

Computing device 102 includes a processor 212, the communications module 218, and the memory 220 that includes applications such as web browser application 110 and e-mail application 160. Computing device 102 also includes an input device 216, such as a keyboard or mouse, and an output device 214, such as a display. Such output device 214 and input device 216 may make up user interface component 104 shown in FIGS. 1A and 1B. The processor 212 of computing device 102 is configured to execute instructions, such as instructions physically coded into the processor 212, instructions received from software (e.g., web browser application 110 and e-mail application 160) in memory 232, or a combination of both.

For example, the processor 212 of computing device 102 executes instructions to send a request to telephony server 130 over network 150 to initiate a call between computing device 102 and telephony device 140. The call may be a VoIP call, a video call, an audio call, or any other audio and/or video call via network 150.

The processor 212 of computing device 102 further executes instructions to output, for display at output device 214, a graphical user interface (GUI). The processor 212 of computing device 102 further executes instructions to provide, by a first process executing at processor 212, a first one or more call controls in the GUI for controlling the call. The first process may be any one of browser processes 112A-112C, e-mail application, or any other process or software stored in memory 232, and providing the first one or more call controls may include rendering a set of call controls in a window, browser tab, and the like that is associated with the first process.

The processor 212 of computing device 102 further executes instructions to provide, by a second process executing at processor 212, a second one or more call controls in the GUI for controlling the telephonic call. The second process may be any one of browser processes 112A-112C, e-mail application, or any other process or software stored in memory 232 other than the first process, and providing the second one or more call controls may include rendering a set of call controls in a window, browser tab, and the like that is associated with the second process.

The processor 212 of computing device 102 further executes instructions to, in response to receiving user input indicative of a selection of a call control from the first one or more call controls to perform an action associated with the first call control, updating, by the second process executing at processor 212, the second one or more call controls based at least in part on the first action to be performed for the call. For example, when the first process receives the indication of the action to be performed, the first process may send an indication of the action to telephony server 130 and/or the second process. In some examples, the first process may send an indication of the action directly to the second process. In other examples, telephony server 130 may send an indication of the action to the second process in the form of updated call state information.

In accordance with aspects of the present disclosure, a system such as computing device 102 includes a memory 220 configured to store a first process and a second process. The first process may be any one of browser processes 112A-112C, e-mail application, or any other process or software stored in memory 232, and the second process may be any one of browser processes 112A-112C, e-mail application, or any other process or software stored in memory 232 other than the first process.

Processor 212 may be configured to send a request to a telephony server 130 over a network 150 to initiate a call between the system 102 and a telephony device 140. Processor 212 may be further configured to output, for display at a display device 214, a graphical user interface (GUI). Processor 212 may be further configured to execute the first process to provide a first one or more call controls in the GUI for controlling the call. Processor 212 may be further configured to execute the second process to provide a second one or more call controls in the GUI for controlling the call.

Processor 212 may be further configured to, in response to receiving user input indicative of a selection of a call control from the first one or more call controls to perform an action for the call, execute the second process to update the second one or more call controls based at least in part on the action to be performed for the call.

In some examples, the first process comprises a first browser process 112A of a web browser 110, and the second process comprises a second browser process 112B of the web browser 110. In some examples, the processor 212 configured to execute the first process to provide the first one or more call controls in the GUI for controlling the call is further configured to execute the first browser process to render contents of a first browser tab in the GUI that includes the first one or more call controls. In some examples, the processor 212 configured to execute the second process to provide the second one or more call controls in the GUI for controlling the call is further configured to execute the second browser process to render contents of a second browser tab in the GUI that includes the second one or more call controls.

In some examples, the first process comprises an application 160 and the second process comprises a browser process 112C of a web browser 110. In some examples, the processor 212 configured to execute the first process to provide the first one or more call controls in the GUI for controlling the call is further configured to execute the application 160 to render the interface that includes the first one or more call controls. In some examples, the processor 212 configured to execute the second process to provide the second one or more call controls in the GUI for controlling the call is further configured to execute the browser process 110C to render contents of the web browser in the GUI that includes the second one or more call controls.

In some examples, the processor 212 is further configured to, in response to receiving the user input indicative of the selection of the call control from the first one or more call controls to perform the action for the call, execute the first process to send, to the second process, updated call state information associated with the action. In some examples, processor 212 is further configured to execute the second process to receive the updated call state information from the first process. In some examples, the processor 212 configured to execute the second process to update the second one or more call controls based at least in part on the first action to be performed for the call is further configured to execute the second process to, in response to receiving the updated call state information from the first process, update the second one or more call controls provided by the second process based at least in part on the updated call state information.

In some examples, the user input is a first input, the selection of a call control is a first selection of a first call control, the action for the call is a first action for the call, and the processor 212 is further configured to, in response to receiving second user input indicative of a second selection of a second call control from the second one or more call controls to perform a second action for the call, execute the second process to send, to the first process, a first indication of the second action to be performed for the call, and execute the first process to update the first one or more call controls based at least in part on the second action to be performed for the call.

In some examples, the processor 212 is further configured to execute the second process to receive updated call state information associated with the action from the telephony server, and the processor 212 configured to execute the second process to update the second one or more call controls based at least in part on the first action to be performed for the call is further configured to execute the second process to, in response to receiving the updated call state information from the telephony server, update the second one or more call controls provided by the second process based at least in part on the updated call state information.

In some examples, the user input is a first input, the selection of a call control is a first selection of a first call control, the action for the call is a first action for the call, the updated call state information is a first updated call state information, and the processor 212 is further configured to: execute the second process to, in response to receiving second user input indicative of a second selection of a second call control from the second one or more call controls to perform a second action for the call, send, to the telephony server 130, an indication of the second action to be performed for the call. The processor 212 is further configured to execute the first process to receive, from the telephony server, a second updated call state information associated with the second action. The processor 212 is further configured to execute the first process to update the first one or more call controls based at least in part on the second updated call state information.

In some examples, the action for the call comprises one of: receiving the call, recording the call, pausing recording of the call, muting the call, unmuting the call, placing the call on hold, resuming the call from hold, transferring the call, sending the call to voicemail, or conferencing one or more additional participants into the call.

Figure 3A:
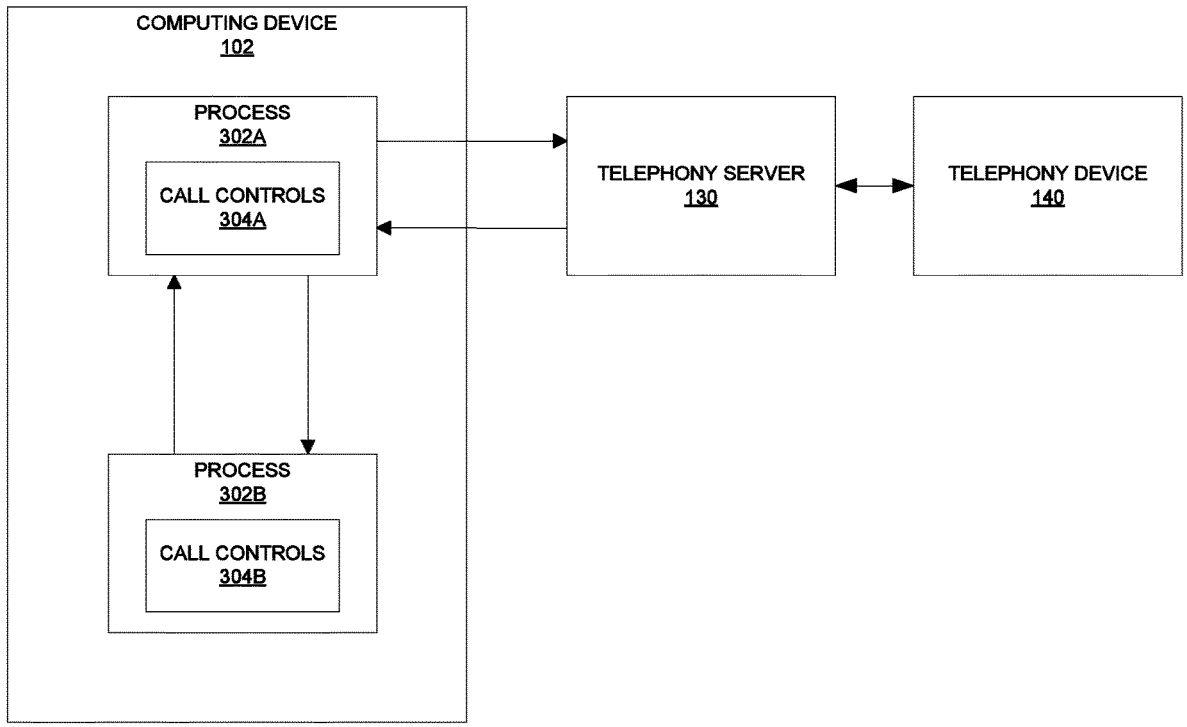
FIGS. 3A and 3B are block diagrams illustrating of how example processes of an example computing device may communicate to synchronize example call controls provided by the example processes.
Figure 3B:
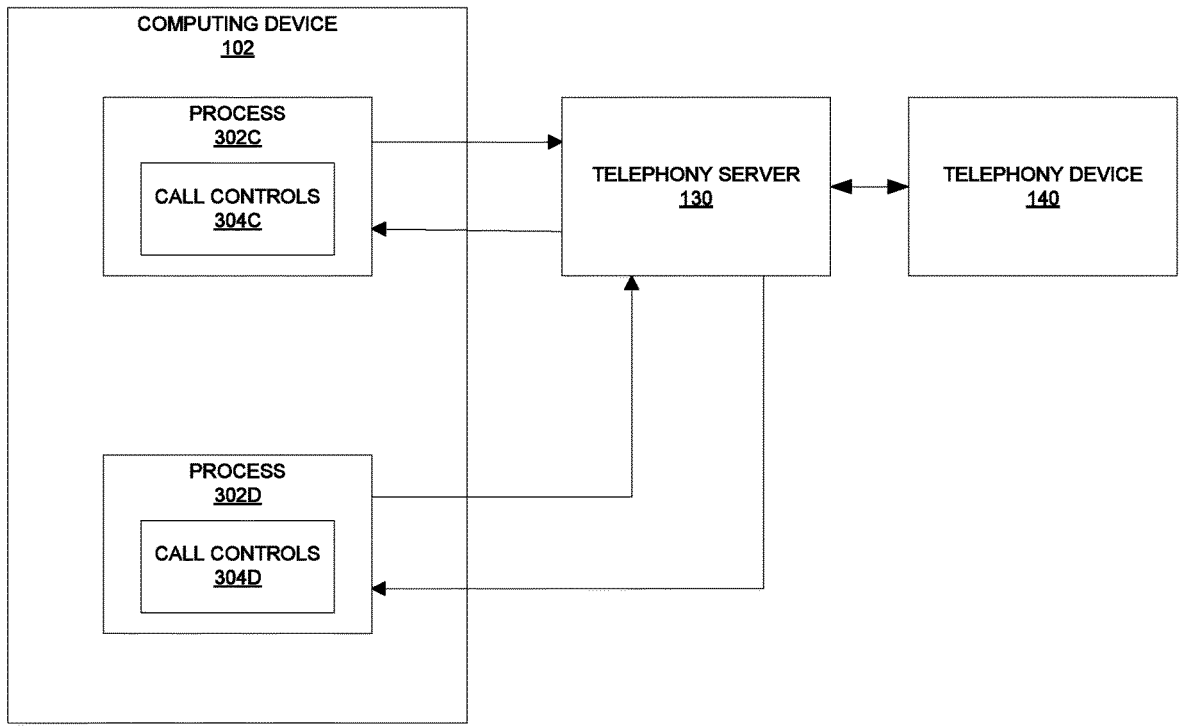

FIGS. 3A and 3B are block diagrams illustrating of how example processes of an example computing device may communicate to synchronize example call controls provided by the example processes. FIGS. 3A and 3B illustrate computing device 102 that communicates with telephony server 130 to initiate a call between computing device 102 and telephony device 140.

As shown in FIG. 3A, processes 302A and 302B may execute at computing device 102 to provide respective call controls 304A and 304B to control the call between computing device 102 and telephony device 140. Examples of processes 302A and 302B may include any of browser processes 112A-112C and e-mail application 160 shown in FIGS. 1A and 1B, or any other suitable processes and/or applications that may execute at computing device 102. Similarly, examples of call controls 304A and 304B may include any of call controls 132, 134, 176, and 178 shown in FIGS. 1A and 1B, or any other suitable call controls for controlling the call between computing device 102 and telephony device 140. In some examples, processes 302A and 302B may represent examples of processes 112A and 112B shown in FIG. 1A, and call controls 304A and 304B may represent examples of call controls 132 and 134 shown in FIG. 1A.

While processes that execute at computing device 102 to provide call controls for controlling the call between computing device 102 and telephony device 140 may communicate with each other, not all of the processes may communicate with telephony server 130. In the example of FIG. 3A, processes 302A and 302B may communicate with each other, but only process 302A may communicate with telephony server 130. For example, process 302A may be a browser process that executes at computing device 102 to run a softphone web application that communicates with telephony server 130, while process 302A may be a browser process that is not running a softphone web application.

As described above with respect to FIGS. 1A and 1B, a user may interact with call controls provided by processes executing at computing device 102 to control the call and to cause actions to be performed for the call, such as muting the call, hanging up the call, transferring the call, conferencing additional participants into the call, and the like. When the user interacts with call controls provided by a process to select or indicate an action to be performed for the call, computing device 102 and/or telephony server 130 may perform the action for the call selected by the user.

In the example of FIG. 3A, for processes 302A and 302B that provide call controls 304A and 304B for a call between computing device 102 and telephony device 140 via telephony server 130, only one process may directly communicate with telephony server 130. Thus, while process 302A may communicate directly with telephony server 130, process 302B may not communicate directly with telephony server 130.

The user may interact with call controls 304A provided by process 302A to select a control associated with an action to be performed for the call, and process 302A may receive an indication of the action that is to be performed for the call. Process 302A may determine whether the action may be performed by computing device 102 and, if so, computing device 102 may perform the action for the call.

Regardless of whether the action may be performed by computing device 102, process 302A may send an indication of the action to be performed to telephony server 130 and, if the action cannot be performed by computing device 102, then telephony server 130 may perform the action for the call. Telephony server 130 may also update the call state based at least in part on the indication of the action to be performed so that telephony server 130 may track the call state between computing device 102 and telephony device 140.

Because process 302B may not directly communicate with telephony server 130, telephony server 130 may not be able to send updated call to process 302B in response to process 302A receiving the indication of the action that is to be performed for the call. Instead, in response to receiving the indication of the action that is to be performed for the call, process 302A may communicate with process 302B so that process 302B may update call controls 304B based at least in part on the action that is to be performed for the call. For example, upon computing device 102 or telephony server 130 performing the action for the call, process 302A may send, to process 302B, updated call state information based at least in part on the action performed for the call, and process 302B may update call controls 304B based at least in part on the updated call state information.

The user may also interact with call controls 304B provided by process 302B to select a control associated with an action to be performed for the call, and process 302B may receive an indication of the action that is to be performed for the call. Process 302B may determine whether the action may be performed by computing device 102 and, if so, computing device 102 may perform the action for the call.

Because process 302B may not directly communicate with telephony server 130, process 302B may not be able to send an indication of the action to be performed directly to telephony server 130. Instead, process 302B may send an indication of the action to be performed to process 302A, and process 302A may send an indication of the action to be performed to telephony server 130. Process 302A may also update call controls 304A based at least in part on the action to be performed.

As shown in FIG. 3B, processes 302C and 302D may execute at computing device 102 to provide respective call controls 304C and 304D to control the call between computing device 102 and telephony device 140. Examples of processes 302C and 302D may include any of browser processes 112A-112C and e-mail application 160 shown in FIGS. 1A and 1B, or any other suitable processes and/or applications that may execute at computing device 102. Similarly, examples of call controls 304C and 304D may include any of call controls 132, 134, 176, and 178 shown in FIGS. 1A and 1B, or any other suitable call controls for controlling the call between computing device 102 and telephony device 140. In some examples, processes 302C and 302D may represent examples of browser process 112C and e-mail application 160, respectively, shown in FIG. 1B, and call controls 304C and 304D may represent examples of call controls 176 and 178, respectively, shown in FIG. 1B.

In the example of FIG. 3B, processes that execute at computing device 102 to provide call controls for controlling the call between computing device 102 and telephony device 140 may not communicate with each other in order to send and receive indications of actions to be performed for the call nor to send and receive updated call information, instead the processes may communicate with telephony server 130 in order to send and receive such data.

The user may interact with call controls 304C provided by process 302C to select a control associated with an action to be performed for the call, and process 302C may receive an indication of the action that is to be performed for the call. Process 302C may determine whether the action may be performed by computing device 102 and, if so, computing device 102 may perform the action for the call.

Regardless of whether the action may be performed by computing device 102, process 302C may send an indication of the action to be performed to telephony server 130 and, if the action cannot be performed by computing device 102, then telephony server 130 may perform the action for the call. Telephony server 130 may also update the call state based at least in part on the indication of the action to be performed so that telephony server 130 may track the call state between computing device 102 and telephony device 140.

Because process 302D may not communicate with process 302C to send and receive indications of actions to be performed for the call nor to send and receive updated call information, telephony device 140 may send updated call state information based at least in part on the action to be performed to process 302D, so that process 302D may receive updated call state information from telephony device 140 and may update call controls 304D based at least in part on the updated call state information.

The user may also interact with call controls 304D provided by process 302D to select a control associated with an action to be performed for the call, and process 302D may receive an indication of the action that is to be performed for the call. Process 302D may determine whether the action may be performed by computing device 102 and, if so, computing device 102 may perform the action for the call.

Regardless of whether the action may be performed by computing device 102, process 302D may send an indication of the action to be performed to telephony server 130 and, if the action cannot be performed by computing device 102, then telephony server 130 may perform the action for the call. Telephony server 130 may also update the call state based at least in part on the indication of the action to be performed so that telephony server 130 may track the call state between computing device 102 and telephony device 140.

Because process 302C may not communicate with process 302D to send and receive indications of actions to be performed for the call nor to send and receive updated call information, telephony device 140 may send updated call state information based at least in part on the action to be performed to process 302C, so that process 302C may receive updated call state information from telephony device 140 and may update call controls 304C based at least in part on the updated call state information.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
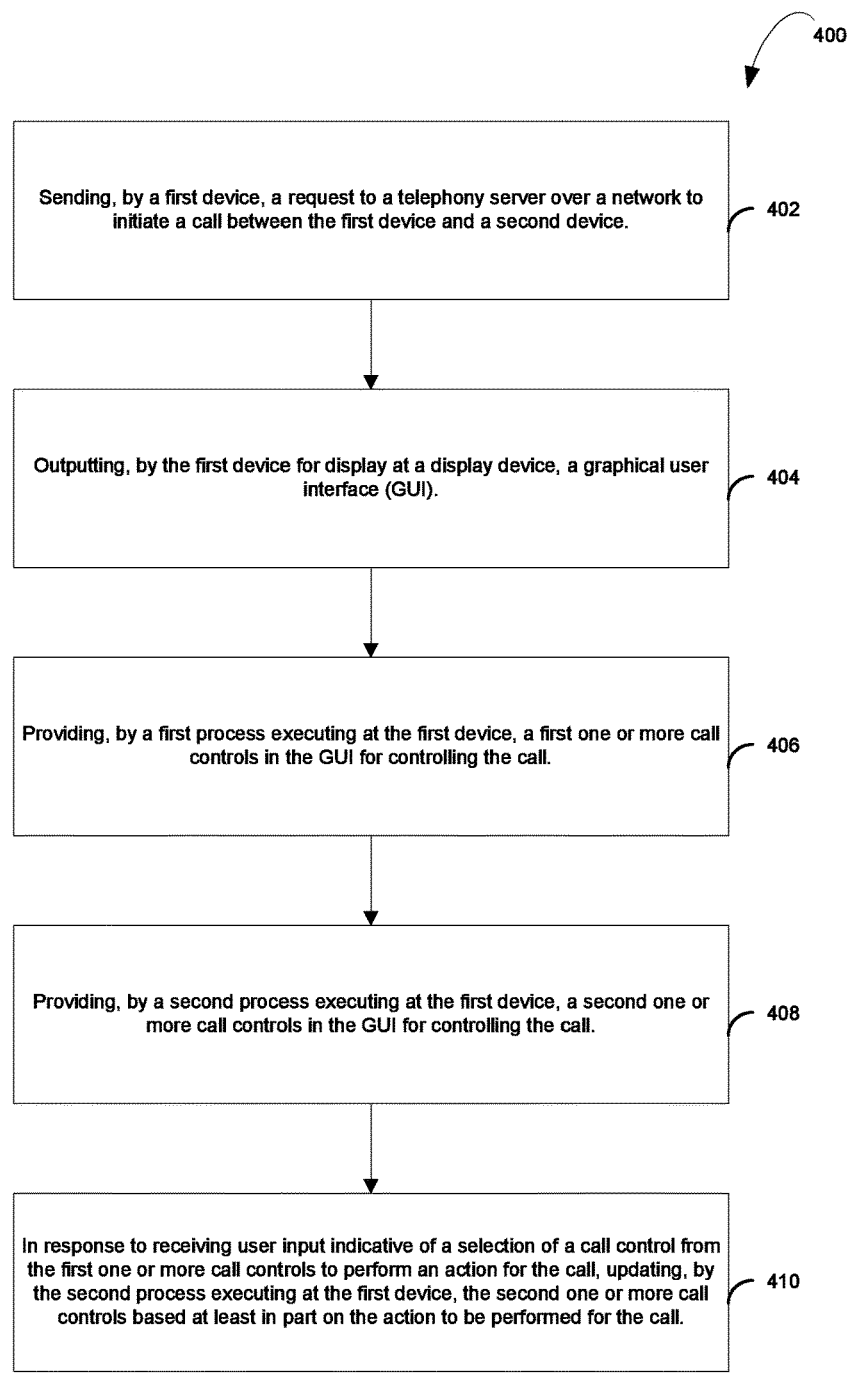
FIG. 4 illustrates an example process 304 for integrating call controls for controlling a call across multiple processes using the example computing device of FIGS. 1A-1B, 2, and 3A-3B.

FIG. 4 illustrates an example process 304 for integrating call controls for controlling a call across multiple processes using the example computing device of FIGS. 1A-1B, 2, and 3A-3B. While FIG. 4 is described with reference to FIGS. 1A-1B, 2, and 3A-3B, it should be noted that the process steps of FIG. 4 may be performed by other systems.

The process 400 begins by proceeding to step 402 where a computing device 102 may send a request to a telephony server 130 over a network 150 to initiate a call between the computing device 102 and a telephony device 140. The process 400 may continue to step 404 where the computing device 102 may output, for display at a display device 104, a graphical user interface (GUI). The process 400 may continue to step 406 where a first process executing at the computing device 102 may provide a first one or more controls in the GUI for controlling the call. The process 400 may continue to step 408 where a second process executing at the computing device 102 may provide a second one or more controls in the GUI for controlling the call. The process 400 may continue to step 410 where in response to receiving user input indicative of a selection of a call control from the first one or more call controls to perform an action for the call, the second process executing at the computing device 102 may update the second one or more call controls based at least in part on the action to be performed for the call.

In some examples, the first process comprises a first browser process of a web browser executing at the computing device 102. In some examples, providing, by the first process executing at the computing device 102, the first one or more call controls in the GUI for controlling the call comprises rendering, by the first browser process, contents of a first browser tab in the GUI that includes the first one or more call controls. In some examples, the second process comprises a second browser process of the web browser executing at the computing device 102. In some examples, providing, by the second process executing at the computing device 102, the second one or more call controls in the GUI for controlling the call comprises rendering, by the second browser process, contents of a second browser tab in the GUI that includes the second one or more call controls.

In some examples, the first process comprises an application executing at the computing device 102. In some examples, providing, by the first process executing at the computing device 102, the first one or more call controls in the GUI for controlling the call comprises rendering, by the application, an interface that includes the first one or more call controls. In some examples, the second process comprises a browser process of a web browser executing at the computing device 102. In some examples, providing, by the second process executing at the computing device 102, the second one or more call controls in the GUI for controlling the call comprises rendering, by the browser process, contents of the web browser in the GUI that includes the second one or more call controls.

In some examples, in response to receiving the user input indicative of the selection of the call control from the first one or more call controls to perform the action for the call, the process 400 may further include sending, by the first process to the second process, updated call state information associated with the action. In some examples, process 400 may further include receiving, by the second process, the updated call state information from the first process. In some examples, updating, by the second process executing at the computing device, the second one or more call controls based at least in part on the first action to be performed for the call further comprises in response to receiving the updated call state information from the first process, updating, by the second process, the second one or more call controls provided by the second process based at least in part on the updated call state information.

In some examples, the user input is a first input, the selection of a call control is a first selection of a first call control, and the action for the call is a first action for the call, and the process 400 may further include in response to receiving second user input indicative of a second selection of a second call control from the second one or more call controls to perform a second action for the call. The process 400 may further include sending, by the second process to the first process, a first indication of the second action to be performed for the call. The process 400 may further include updating, by the first process executing at the computing device, the first one or more call controls based at least in part on the second action to be performed for the call.

In some examples, process 400 may further include receiving, by the second process, updated call state information associated with the action from the telephony server 130. In some examples, updating, by the second process executing at the computing device 102, the second one or more call controls based at least in part on the first action to be performed for the call further comprises in response to receiving the updated call state information from the telephony server 130, updating, by the second process, the second one or more call controls provided by the second process based at least in part on the updated call state information.

In some examples, the user input is a first input, the selection of a call control is a first selection of a first call control, the action for the call is a first action for the call, and the updated call state information is a first updated call state information, and the process 400 may further include in response to receiving second user input indicative of a second selection of a second call control from the second one or more call controls to perform a second action for the call, sending, by the second process to the telephony server, an indication of the second action to be performed for the call. The process 400 may further include receiving, by the first process from the telephony server, a second updated call state information associated with the second action. The process 400 may further include updating, by the first process executing at the computing device, the first one or more call controls based at least in part on the second updated call state information.

In some examples, the action for the call comprises one of: receiving the call, recording the call, pausing recording of the call, muting the call, unmuting the call, placing the call on hold, resuming the call from hold, transferring the call, sending the call to voicemail, or conferencing one or more additional participants into the call.

In some examples, the process 400 further includes computing device 102 performing the action for the call. In some examples, the process 400 further includes telephony server 130 performing the action for the call. In some examples, the call comprises a Voice over Internet Protocol (VoIP) call between the computing device 102 and the telephony device 140.

FIG. 4 set forth an example process 400 for integrating call controls for controlling a call across multiple processes using the example architecture 100 of FIGS. 1A, 1B, and 2. An example will now be described using the example process 400 of FIG. 4.

The process 400 begins by proceeding to step 402 where a computing device 102 may send a request to a telephony server 130 over a network 150 to initiate a call between the computing device 102 and a telephony device 140. The process 400 may continue to step 404 where the computing device 102 may output, for display at a display device 104, a graphical user interface (GUI). The process 400 may continue to step 406 where a first process, such as browser process 112A of web browser 110 executing at the computing device 102, may provide a first one or more controls 132 in contents 124A of browser tab 122A in the GUI for controlling the call. The process 400 may continue to step 408 where a second process, such as browser process 112B of web browser 110 executing at the computing device 102, may provide a second one or more controls 134 in contents 124B of browser tab 122B in the GUI for controlling the call. The process 400 may continue to step 410 where in response to receiving user input indicative of a selection of a call control from the first one or more call controls 132 to perform an action for the call, such as muting the call, the second process executing at the computing device 102 may update the second one or more call controls 134 based at least in part on the action to be performed for the call, such as by updating the call controls 134 provided by browser process 112B to include an unmute button in place of the mute button.

Hardware Overview

Figure 5:
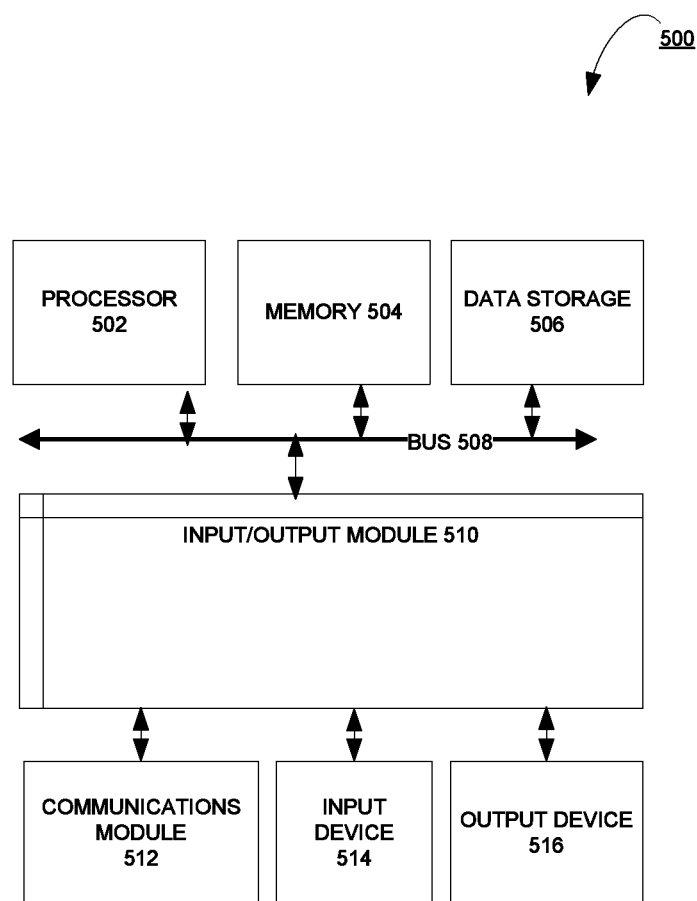
FIG. 5 is a block diagram illustrating an example computer system 500 with which the computing device and telephony server of FIGS. 1A-1B, 2, and 3A-3B can be implemented.

FIG. 5 is a block diagram illustrating an example computer system 500 with which the computing device and telephony server of FIGS. 1A-1B, 2, and 3A-3B can be implemented. In certain aspects, the computer system 500 may be implemented using hardware or a combination of software and hardware, either in a dedicated server, or integrated into another entity, or distributed across multiple entities.

Computer system 500 (e.g., computing device and telephony server 130) includes a bus 508 or other communication mechanism for communicating information, and a processor 502 (e.g., processor 212 and 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communication module 218 and 238) include networking interface cards, such as Ethernet cards and modems.

Components of the system can be interconnected by any form or medium of digital data communication, e.g., a communication network. The communication network (e.g., network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, computing device 102 and telephony server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 104, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for integrating call controls for controlling a call across multiple processes, the method comprising:
    sending, by a computing device, a request to a telephony server over a network to initiate a call between the computing device and a telephony device, the call comprising an ongoing call;
    outputting, by the computing device for display at a display device, a graphical user interface (GUI);
    providing, by a first process executing at the computing device, a first one or more call controls in the GUI for controlling the ongoing call, wherein the first process comprises a web browser application;
    initiating, through the first process of the web browser application, the ongoing call between the computing device and the telephony device;
    providing, by a second process executing at the computing device, a second one or more call controls in the GUI for controlling the ongoing call, wherein the second process comprises an e-mail application; and
    in response to receiving user input indicative of a selection of a call control from the first one or more call controls to perform an action for the ongoing call, updating, by the second process executing at the computing device, the second one or more call controls based at least in part on the action to be performed for the ongoing call,
    wherein the second one or more call controls are usable to control the same call established by the telephony server between the computing device and the telephony device when the web browser application is not visible in the GUI.

2. The computer-implemented method of claim 1, wherein:
    the first process comprises a first browser process of a web browser executing at the computing device;
    providing, by the first process executing at the computing device, the first one or more call controls in the GUI for controlling the call comprises rendering, by the first browser process, contents of a first browser tab in the GUI that includes the first one or more call controls;
    the second process comprises a second browser process of the web browser executing at the computing device; and
    providing, by the second process executing at the computing device, the second one or more call controls in the GUI for controlling the call comprises rendering, by the second browser process, contents of a second browser tab in the GUI that includes the second one or more call controls.

3. The computer-implemented method of claim 1, wherein:
    the first process comprises an application executing at the computing device;
    providing, by the first process executing at the computing device, the first one or more call controls in the GUI for controlling the call comprises rendering, by the application, an interface that includes the first one or more call controls;
    the second process comprises a browser process of a web browser executing at the computing device; and
    providing, by the second process executing at the computing device, the second one or more call controls in the GUI for controlling the call comprises rendering, by the browser process, contents of the web browser in the GUI that includes the second one or more call controls.

4. The computer-implemented method of claim 1, further comprising:
    in response to receiving the user input indicative of the selection of the call control from the first one or more call controls to perform the action for the call, sending, by the first process to the second process, updated call state information associated with the action; and
    receiving, by the second process, the updated call state information from the first process;
    wherein updating, by the second process executing at the computing device, the second one or more call controls based at least in part on the action to be performed for the call further comprises in response to receiving the updated call state information from the first process, updating, by the second process, the second one or more call controls provided by the second process based at least in part on the updated call state information.

5. The computer-implemented method of claim 4, wherein the user input is a first input, wherein the selection of a call control is a first selection of a first call control, and wherein the action for the call is a first action for the call, further comprising:
    in response to receiving second user input indicative of a second selection of a second call control from the second one or more call controls to perform a second action for the call:
        sending, by the second process to the first process, a first indication of the second action to be performed for the call, and
        updating, by the first process executing at the computing device, the first one or more call controls based at least in part on the second action to be performed for the call.

6. The computer-implemented method of claim 1, further comprising:
    receiving, by the second process, updated call state information associated with the action from the telephony server;
    wherein updating, by the second process executing at the computing device, the second one or more call controls based at least in part on the first action to be performed for the call further comprises in response to receiving the updated call state information from the telephony server, updating, by the second process, the second one or more call controls provided by the second process based at least in part on the updated call state information.

7. The computer-implemented method of claim 6, wherein the user input is a first input, wherein the selection of a call control is a first selection of a first call control, wherein the action for the call is a first action for the call, and wherein the updated call state information is a first updated call state information, further comprising:
in response to receiving second user input indicative of a second selection of a second call control from the second one or more call controls to perform a second action for the call, sending, by the second process to the telephony server, an indication of the second action to be performed for the call;
receiving, by the first process from the telephony server, a second updated call state information associated with the second action; and
updating, by the first process executing at the computing device, the first one or more call controls based at least in part on the second updated call state information.

8. The computer-implemented method of claim 1, wherein the action for the call comprises one of: receiving the call, recording the call, pausing recording of the call, muting the call, unmuting the call, placing the call on hold, resuming the call from hold, transferring the call, sending the call to voicemail, or conferencing one or more additional participants into the call.

9. The computer-implemented method of claim 1, wherein the call comprises a Voice over Internet Protocol (VoIP) call between the computing device and the telephony device.

10. A system for integrating call controls for controlling a call across multiple processes, comprising:
a memory configured to store a first process and a second process; and
a processor configured to:
send a request to a telephony server over a network to initiate a call between the system and a telephony device, the call comprising an ongoing call;
output, for display at a display device, a graphical user interface (GUI);
execute the first process to provide a first one or more call controls in the GUI for controlling the ongoing call, wherein the first process comprises a web browser application;
initiate, through the first process of the web browser application, the ongoing call between the computing device and the telephony device;
execute the second process to provide a second one or more call controls in the GUI for controlling the ongoing call, wherein the second process comprises an e-mail application; and
in response to receiving user input indicative of a selection of a call control from the first one or more call controls to perform an action for the ongoing call, execute the second process to update the second one or more call controls based at least in part on the action to be performed for the ongoing call,
wherein the second one or more call controls are usable to control the same call established by the telephony server between the computing device and the telephony device when the web browser application is not visible in the GUI.

11. The system of claim 10, wherein:
the first process comprises a first browser process of a web browser;
the second process comprises a second browser process of the web browser;
the processor is configured to execute the first process to provide the first one or more call controls in the GUI for controlling the call is further configured to execute the first browser process to render contents of a first browser tab in the GUI that includes the first one or more call controls; and
the processor configured to execute the second process to provide the second one or more call controls in the GUI for controlling the call is further configured to execute the second browser process to render contents of a second browser tab in the GUI that includes the second one or more call controls.

12. The system of claim 10, wherein:
the first process comprises an application;
the second process comprises a browser process of a web browser;
the processor configured to execute the first process to provide the first one or more call controls in the GUI for controlling the call is further configured to execute the application to render an interface that includes the first one or more call controls;
the processor configured to execute the second process to provide the second one or more call controls in the GUI for controlling the call is further configured to execute the browser process to render contents of the web browser in the GUI that includes the second one or more call controls.

13. The system of claim 10, wherein:
the processor is further configured to:
in response to receiving the user input indicative of the selection of the call control from the first one or more call controls to perform the action for the call, execute the first process to send, to the second process, updated call state information associated with the action; and
execute the second process to receive the updated call state information from the first process;
wherein the processor configured to execute the second process to update the second one or more call controls based at least in part on the first action to be performed for the call is further configured to execute the second process to, in response to receiving the updated call state information from the first process, update the second one or more call controls provided by the second process based at least in part on the updated call state information.

14. The system of claim 13, wherein the user input is a first input, wherein the selection of a call control is a first selection of a first call control, wherein the action for the call is a first action for the call, and wherein the processor is further configured to:
in response to receiving second user input indicative of a second selection of a second call control from the second one or more call controls to perform a second action for the call:
execute the second process to send, to the first process, a first indication of the second action to be performed for the call, and
execute the first process to update the first one or more call controls based at least in part on the second action to be performed for the call.

15. The system of claim 10, wherein:
the processor is further configured to execute the second process to receive updated call state information associated with the action from the telephony server; and
the processor configured to execute the second process to update the second one or more call controls based at least in part on the first action to be performed for the call is further configured to execute the second process to, in response to receiving the updated call state information from the telephony server, update the second one or more call controls provided by the second process based at least in part on the updated call state information.

16. The system of claim 15, wherein the user input is a first input, wherein the selection of a call control is a first selection of a first call control, wherein the action for the call is a first action for the call, wherein the updated call state information is a first updated call state information, and wherein the processor is further configured to:
execute the second process to, in response to receiving second user input indicative of a second selection of a second call control from the second one or more call controls to perform a second action for the call, send, to the telephony server, an indication of the second action to be performed for the call;
execute the first process to receive, from the telephony server, a second updated call state information associated with the second action; and
execute the first process to update the first one or more call controls based at least in part on the second updated call state information.

17. The system of claim 10, wherein the action for the call comprises one of: receiving the call, recording the call, pausing recording of the call, muting the call, unmuting the call, placing the call on hold, resuming the call from hold, transferring the call, sending the call to voicemail, or conferencing one or more additional participants into the call.

18. A non-transitory machine-readable storage medium comprising machine-readable instructions for causing a processor of a computing device to execute a method for integrating call controls for controlling a call across multiple processes, comprising:
sending a request to a telephony server over a network to initiate a call between the computing device and a telephony device, the call comprising an ongoing call;
outputting, for display at a display device, a graphical user interface (GUI);
providing, by a first process, a first one or more call controls in the GUI for controlling the ongoing call, wherein the first process comprises a web browser application;
initiating, through the first process of the web browser application, the ongoing call between the computing device and the telephony device;
providing, by a second process, a second one or more call controls in the GUI for controlling the ongoing call, wherein the second process comprises an e-mail application; and
in response to receiving user input indicative of a selection of a call control from the first one or more call controls to perform an action for the ongoing call, updating, by the second process, the second one or more call controls based at least in part on the action to be performed for the ongoing call,
wherein the second one or more call controls are usable to control the same call established by the telephony server between the computing device and the telephony device when the web browser application is not visible in the GUI.

* * * * *